United States Patent
No et al.

(10) Patent No.: US 10,587,407 B2
(45) Date of Patent: Mar. 10, 2020

(54) DATA ENCRYPTION APPARATUS AND METHOD USING AN ENCRYPTION KEY BASED ON PUNCTURING OF A GENERATOR MATRIX

(71) Applicants: Seoul National University R&DB Foundation, Seoul (KR); Industry-Academic Cooperation Foundation, Chosun University, Gwangju (KR)

(72) Inventors: Jong-Seon No, Seoul (KR); Wijik Lee, Seoul (KR); Young-Sik Kim, Gwangju (KR)

(73) Assignees: Seoul National University R&DB Foundation, Seoul (KR); Industry-Academic Cooperation Foundation, Chosun University, Gwangju (KR)

(*) Notice: Subject to any disclaimer, the term of this patent is extended or adjusted under 35 U.S.C. 154(b) by 190 days.

(21) Appl. No.: 15/817,293

(22) Filed: Nov. 20, 2017

(65) Prior Publication Data
US 2018/0145832 A1 May 24, 2018

(30) Foreign Application Priority Data
Nov. 24, 2016 (KR) .......................... 10-2016-0157232

(51) Int. Cl.
*H04L 9/30* (2006.01)
*H04L 9/08* (2006.01)
*H03M 13/00* (2006.01)
*H03M 13/13* (2006.01)

(52) U.S. Cl.
CPC ............ *H04L 9/304* (2013.01); *H04L 9/0861* (2013.01); *H03M 13/136* (2013.01); *H03M 13/616* (2013.01); *H03M 13/6362* (2013.01)

(58) Field of Classification Search
CPC combination set(s) only.
See application file for complete search history.

(56) References Cited

U.S. PATENT DOCUMENTS

2018/0176015 A1* 6/2018 Wang ................... H04L 9/304

FOREIGN PATENT DOCUMENTS

KR 10-1206433 B1 11/2012

OTHER PUBLICATIONS

Lorenz Minder et al, Laboratoire de mathematiques algorithmiques (LMZ), EPFL, "Cryptanalysis of the Sidelnikov Cryptosystem", M. Naor (Ed.): EUROCRYPT 2007, LNCS 4515, pp. 347-360, 2007.
(Continued)

*Primary Examiner* — Minh Dinh
(74) *Attorney, Agent, or Firm* — Park, Kim & Suh, LLC

(57) ABSTRACT

Disclosed are a data encryption apparatus and a data encryption method using an encryption key based on puncturing of a generator matrix. Bit values located in a column at a specific point are punctured from a generator matrix of a Reed-Muller (RM) code and thereafter, encryption of a message is performed through a public key generated by using the punctured generator matrix to defend an attack from a third party based on a structure of the RM code by change of the structure of the generator matrix, thereby solving security vulnerability caused as the existing McEliece encryption system uses the generator matrix of the RM code having a special structure as it is.

11 Claims, 2 Drawing Sheets

(56) References Cited

OTHER PUBLICATIONS

I.V.Chizhov et al., Lomonosov Moscow State University, "The failure of McEliece PKC based on Reed-Muller codes", pp. 1-11, Oct. 9, 2013.

Taegyun Noh et al., "A Study on the variable length Reed Muller code designs", Fall Conference, Korean Information and Communications Society (KICS), pp. 618-619, 2015.

Otmani, Ayoub, and Hervé Talé Kalachi. "Square Code Attack on a Modified Sidelnikov Cryptosystem." International Conference on Codes, Cryptology, and Information Security. Springer, Cham, 2015. (May 28, 2015.), 12 pages.

\* cited by examiner

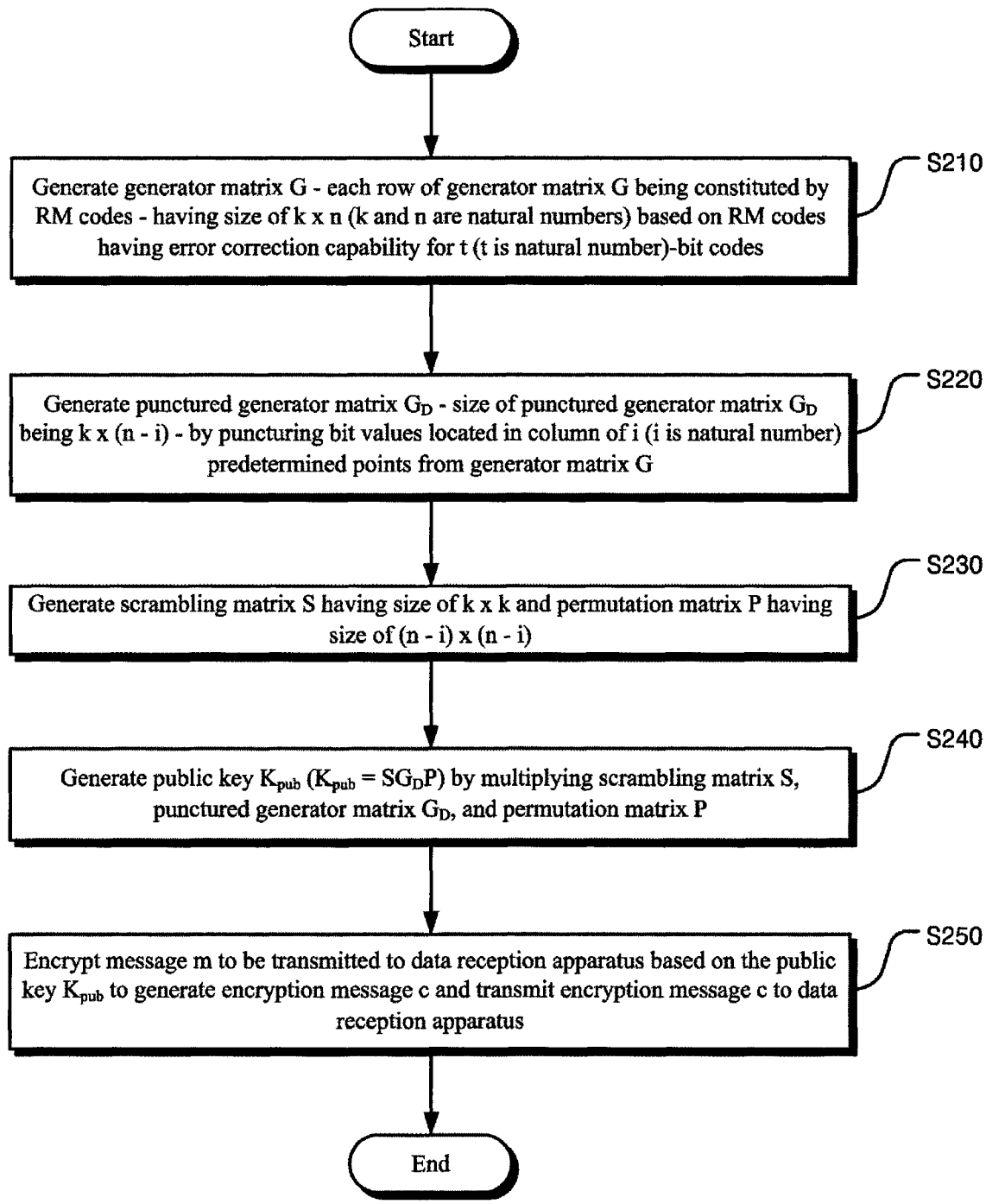

DATA ENCRYPTION APPARATUS AND METHOD USING AN ENCRYPTION KEY BASED ON PUNCTURING OF A GENERATOR MATRIX

CROSS-REFERENCE TO RELATED APPLICATIONS

This application claims priority to and the benefit of Korean Patent Application No. 10-2016-0157232 filed in the Korean Intellectual Property Office on Nov. 24, 2016, the entire contents of which are incorporated herein by reference.

TECHNICAL FIELD

The present invention relates to a technology for strengthening security by defending an attack from a third party in a McEliece encryption system using a generator matrix of a Reed-Muller (RM) code.

BACKGROUND ART

In recent years, as various types of information is generated and circulated, damage such as exposure of important information to a third party is caused due to hacking or transmission of information to an incorrect path.

In particular, when in the state where no defense mechanism is applied to the important information such as military information or personal information during a process of transferring information, the important information is accidentally transmitted to the third party, the third party can easily access the important information, thereby causing great damage.

In recent years, in order to prevent exposure of such important information, there has been introduced a technique of encrypting the important information by using a predetermined encryption key and transmitting the encrypted information to the other party.

In a general data encryption scheme, a scheme is used, in which when a data transmission side and a data reception side share the same secret key and the data transmission side encrypts the data with the secret key and transmits the encrypted data, the data reception side decrypts the data with the same secret key.

However, such a symmetric key based encryption scheme has a weak vulnerability in that there is a risk that the corresponding secret key is exposed in the process of transferring and sharing the secret key.

In order to solve the drawbacks of the symmetric key based encryption scheme, a data encryption method using an asymmetric key, which is called a public key and a private key, has been introduced. In the asymmetric key based data encryption scheme, a scheme is used, in which when the data transmission side encrypts data with the public key and transmits the encrypted data to the data reception side, the data reception side decrypts the data with the private key corresponding to the public key, or when the data transmission side encrypts the data with the private key and transmits the encrypted data to the data reception side, the data reception side decrypts the data with the public key.

Such an asymmetric key based data encryption scheme can minimize the risk of exposure of the encryption key because the data transmission side and the data reception side have different encryption keys.

In recent years, a McEliece encryption system has been introduced as a system to which such an asymmetric key based encryption scheme is applied. The McEliece encryption system is a system in which when a data transmission apparatus generates a public key $K_{pub}$ by using a k×n (k and n is a natural number) sized generator matrix G having an error correction capability for a t (t is the natural number)-bit code, a k×k sized scrambling matrix S and an n×n sized permutation matrix P, encrypts a message m to be transmitted to a data reception apparatus with the public key $K_{pub}$ and generates an encryption message c and thereafter, transmits the encryption message c to the data reception apparatus, the data reception apparatus decrypts the encryption message by using the generator matrix G, the scrambling matrix S, and the permutation matrix P prestored in a memory as the private key to restore the message m.

In this regard, a brief description of the data encryption and decryption schemes in the McEliece encryption system is as follows.

First, $K_{pub}$ which is the public key used by the data transmission apparatus is defined by Equation 1 below.

$$K_{pub} = SGP \qquad \text{[Equation 1]}$$

Here, in Equation 1, the generator matrix G represents the k×n sized generator matrix having the error correction capability for the t-bit code, S represents a randomly determined k×k sized scrambling matrix, and P represents a randomly determined n×n sized permutation matrix.

In this case, the data reception apparatus stores each of the generator matrix G, the scrambling matrix S, and the permutation matrix P with the private key corresponding to the public key $K_{pub}$ in the memory.

Under such a situation, the data transmission apparatus encodes the message m to be transmitted to the data reception apparatus into binary string data having a length of k and then performs an encryption operation on the encoded message m according to Equation 2 below to generate the encryption message c.

$$c = mK_{pub} \oplus e \qquad \text{[Equation 2]}$$

Here, e represents a random vector having a Hamming weight of t or less and having a length of n bits and "$\oplus$" represents an exclusive OR operation.

The Hamming weight means the number of bit values of "1" in a bit string constituting data.

As such, when the encryption message c is generated, the data transmission apparatus completes the data encryption transmission by transmitting the encryption message c to the data reception apparatus.

When the encryption message c is transmitted from the data transmission apparatus to the data reception apparatus, the data reception apparatus uses the generator matrix G, the scrambling matrix S, and the permutation matrix P stored in the memory to decrypt the encryption message.

In this regard, when the encryption message c is received, the data reception apparatus calculates $cP^{-1}$ by multiplying the encrypted message c by $P^{-1}$, which is an inverse matrix of the permutation matrix P, as illustrated in Equation 3 below.

$$cP^{-1} = mSG \oplus eP^{-1} \qquad \text{[Equation 3]}$$

Then, the data reception apparatus may calculate mS by performing data decoding for error correction using the generator matrix G from the $cP^{-1}$.

Here, since the e represents the vector having the Hamming weight of t or less and P represents the permutation matrix, $eP^{-1}$ also has the Hamming weight of t or less, and consequently, it can be seen that $cP^{-1}$ represents that the error occurs with respect to t bit values or less in a codeword mSG. Therefore, the data reception apparatus performs the error correction on $cP^{-1}$ using G, which is the generator matrix having the error correction capability for the t-bit code stored in the memory to decode mS.

When the calculation of the mS is completed, the data reception apparatus multiplies mS by $S^{-1}$ which is the inverse matrix of the scrambling matrix S stored in the memory as illustrated in Equation 4 below to finally decode the original message m.

$$mSS^{-1}=m \qquad \text{[Equation 4]}$$

In recent years, in the McEliece encryption system, the generator matrix of Reed-Muller (RM) codes is often used in connection with the generator matrix G. The RM code is a linear code used as an error correction code. The RM code expressed by RM(r, m) has a length of $2^m$ and m basic codes, and a code having a multiplication of the m basic codes also may be a basic code of RM. r represents the maximum number of basic codes that can be used in the multiplication of the basic codes. For example, when m=4 and r=4, the length of the RM code is 16. In this case, since the RM code is represented by $2^4$, the RM code has four basic codes R1, R2, R3, and R4 (the length of each basic code is 16). In this case, the RM code which calculates the multiplication of the four basic codes R1, R2, R3, and R4 can also be the basic code. Here, since r=4, the maximum number of codes usable for the multiplication of the four basic codes is four in order to generate other additional basic codes for four basic codes R1, R2, R3, and R4, and as a result, a maximum of four mutual multiplications of four basic codes R1, R2, R3, and R4 are combined and calculated to generate additional basic codes. In this regard, with respect to RM(4, 4), four basic codes corresponding to R1, R2, R3, R4 and 11 basic codes consisting of R1R2, R1R3, R1R4, R2R3, R2R4, R3R4, R1R2R3, R1R2R4, R1R3R4, R2R3R4, and R1R2R3R4 may be generated and since the RM code needs to have even a code having bit values of which all are configured by "1" as the basic code due to characteristics of the RM code, a total of 16 basic codes can be consequently generated. In this case, in the McEliece encryption system, the generator matrix G to be used when the message is encrypted by using a total of 16 basic codes can be generated.

Since the RM code has a high error correction capability, the RM code can be used usefully for enhancing security of the encryption system. However, since the RM code has a special structure, it is easy to guess the private key used for data decryption from the RM code. Therefore, if the RM code is just used in the McEliece encryption system, the risk of exposure of important data may increase.

In this regard, the related literature, ""Cryptanalysis of the Sidelnikov Cryptosystem", Lorenz Minder et al., "Advances in cryptology—Eurocrypt 2007", LNCS vol. 4515 (2007)" discloses an attack method for finding the permutation matrix P in the McEliece encryption system based on the characteristics of the RM code and ""The failure of McEliece PKC based on Reed-Muller codes.", I. V. Chizhov et al., Prikl. Diskr. Mat. Suppl., 2013, Issue 6, Pages 48-49 (Oct. 9, 2013)" discloses a method for shorting the process in the attack method.

Therefore, it is necessary to study a method that can defend an attack of a hacker based on specificity of the RM code in the McEliece encryption system using the RM code.

SUMMARY OF THE INVENTION

The present invention has been made in an effort to provide a data encryption apparatus and a data encryption method using an encryption key based on puncturing of a generator matrix which puncture bit values located in a column at a specific point from a generator matrix of a Reed-Muller (RM) code and thereafter, perform encryption of a message through a public key generated by using the punctured generator matrix to defend an attack from a third party based on a structure of the RM code by change of the structure of the generator matrix, thereby solving security vulnerability caused as the existing McEliece encryption system uses the generator matrix of the RM code having a special structure as it is.

An exemplary embodiment of the present invention provides a data encryption apparatus using an encryption key based on puncturing of a generator matrix, including: a generator matrix generation unit generating a generator matrix G—each row of the generator matrix G being constituted by RM codes—having a size of k×n (k and n are natural numbers) based on the RM codes having an error correction capability for t (t is the natural number)-bit codes; a generator matrix puncturing unit generating a punctured generator matrix $G_D$—the size of the punctured generator matrix $G_D$ being k×(n−i)—by puncturing bit values located in a column of i (i is the natural number) predetermined points from the generator matrix G; a matrix generation unit generating a scrambling matrix S having a size of k×k and a permutation matrix P having a size of (n−i)×(n−i); a public key generation unit generating a public key $K_{pub}$ ($K_{pub}=SG_DP$) by multiplying the scrambling matrix S, the punctured generator matrix $G_D$, and the permutation matrix P; and a message encryption and transmission unit encrypting a message m to be transmitted to a data reception apparatus based on the public key $K_{pub}$ to generate an encryption message c and transmitting the encryption message c to the data reception apparatus.

Another exemplary embodiment of the present invention provides a data encryption method using an encryption key based on puncturing of a generator matrix, including: generating a generator matrix G—each row of the generator matrix G being constituted by RM codes—having a size of k×n (k and n are natural numbers) based on the RM codes having an error correction capability for t (t is the natural number)-bit codes; generating a punctured generator matrix $G_D$—the size of the punctured generator matrix $G_D$ being k×(n−i)—by puncturing bit values located in a column of i (i is the natural number) predetermined points from the generator matrix G; generating a scrambling matrix S having a size of k×k and a permutation matrix P having a size of (n−i)×(n−i); generating a public key $K_{pub}$ ($K_{pub}=SG_DP$) by multiplying the scrambling matrix S, the punctured generator matrix $G_D$, and the permutation matrix P; and encrypting a message m to be transmitted to a data reception apparatus based on the public key $K_{pub}$ to generate an encryption message c and transmitting the encryption message c to the data reception apparatus.

According to exemplary embodiments of the present invention, a data encryption apparatus and a data encryption method using an encryption key based on puncturing of a generator matrix puncture bit values located in a column at a specific point from a generator matrix of a Reed-Muller (RM) code and thereafter, perform encryption of a message through a public key generated by using the punctured generator matrix to defend an attack from a third party based on a structure of the RM code by change of the structure of the generator matrix, thereby solving security vulnerability caused as the existing McEliece encryption system uses the generator matrix of the RM code having a special structure as it is.

BRIEF DESCRIPTION OF THE DRAWINGS

FIG. 2 is a flowchart illustrating a data encryption method using an encryption key based on puncturing of a generator matrix according to another exemplary embodiment of the present invention.

DETAILED DESCRIPTION

Figure 1:
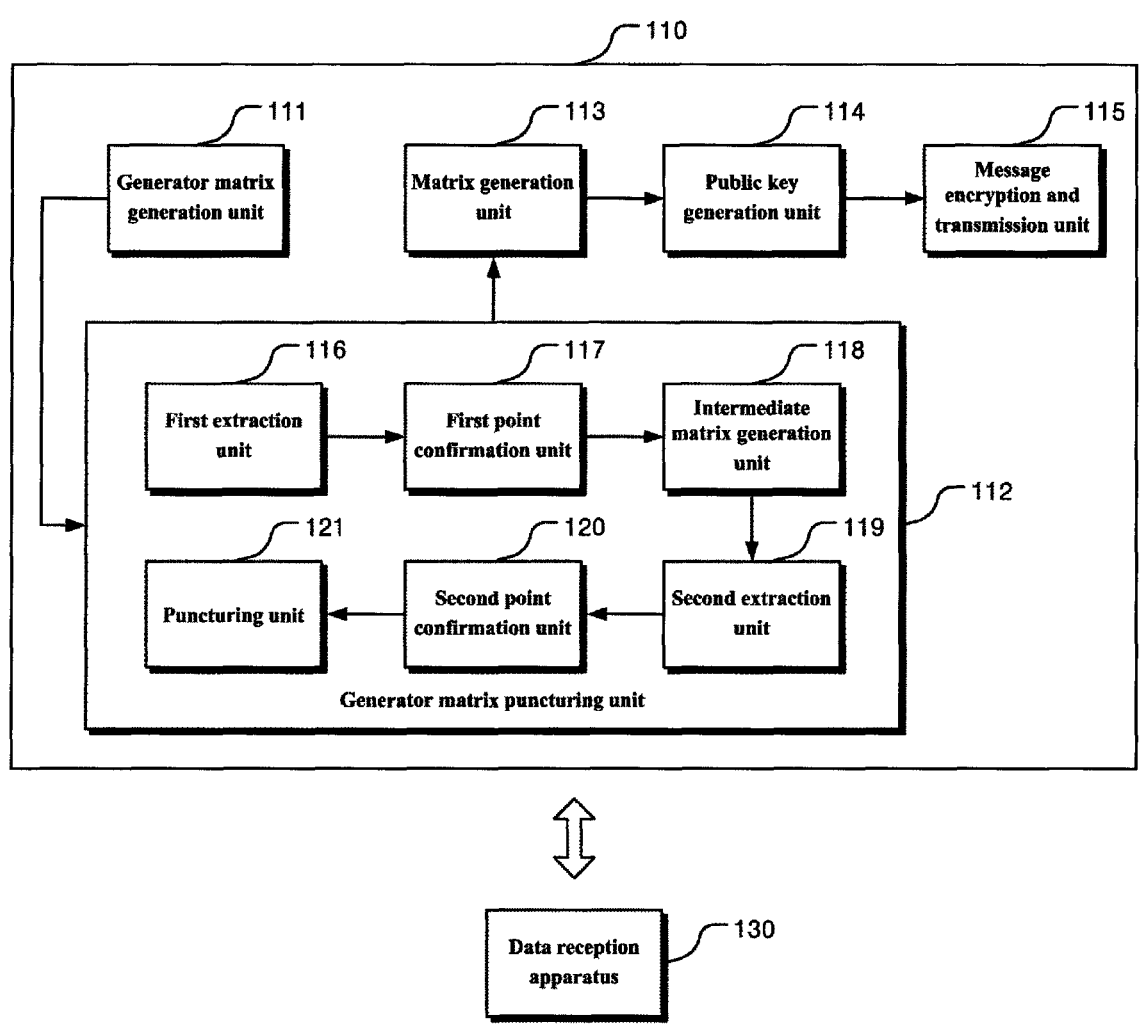
FIG. 1 is a diagram illustrating a structure of a data encryption apparatus using an encryption key based on puncturing of a generator matrix according to an exemplary embodiment of the present invention.

Hereinafter, exemplary embodiments of the present invention will be described in detail with reference to the accompanying drawings. The description does not limit the present invention to specific exemplary embodiments, and it should be understood that the present invention covers all the modifications, equivalents and replacements included within the idea and technical scope of the present invention. In describing each drawing, like reference numerals refer to like elements and if it is not contrarily defined, all terms used herein including technological or scientific terms have the same meanings as those generally understood by a person with ordinary skill in the art.

FIG. 1 is a diagram illustrating a structure of a data encryption apparatus using an encryption key based on puncturing of a generator matrix according to an exemplary embodiment of the present invention.

Referring to FIG. 1, a data encryption apparatus 110 using an encryption key based on puncturing of a generator matrix according to the present invention includes a generator matrix generation unit 111, a generator matrix puncturing unit 112, a matrix generation unit 113, a public key generation unit 114, and a message encryption and transmission unit 115.

The generator matrix generation unit 111 generates a k×n (k and n are natural numbers) sized generator matrix G based on a Reed-Muller (RM) code having an error correction capability for a t (t is the natural number)-bit code.

In this case, the generator matrix generation unit 111 generates RM basic codes having a length of n, which have an error correction capability with respect to t-bit codes and generates codes constituted by result values obtained by multiplying the basic codes by each other and a bit value of "1" as additional RM basic codes to generate the k×n sized generator matrix G based on the corresponding RM basic codes.

As a result, each row of the generator matrix G is constituted by the RM codes.

The generator matrix puncturing unit 112 may generate a punctured generator matrix $G_D$ by puncturing bit values located in a column of i (i is the natural number) predetermined points from the generator matrix G.

Here, the size of the punctured generator matrix $G_D$ is k×(n−i).

In this case, according to the exemplary embodiment of the present invention, the generator matrix puncturing unit 112 may include a first extraction unit 116, a first point confirmation unit 117, an intermediate matrix generation unit 118, a second extraction unit 119, a second point confirmation unit 120, and a puncturing unit 121.

The first extraction unit 116 extracts a first code having a minimum Hamming weight among RM codes existing in each row constituting the generator matrix G.

The first point confirmation unit 117 confirms at least one first point where the bit value of "1" is located in a bit string constituting the first code.

The intermediate matrix generation unit 118 extracts the bit values located in the column corresponding to the at least one first point from the generator matrix G and generates a first matrix having bit values located in the column corresponding to the at least one first point.

The second extraction unit 119 extracts a second code having the minimum Hamming weight among codes existing in each row constituting the first matrix.

The second point confirmation unit 120 confirms at least one second point where the bit value of "1" is located in a bit string constituting the second code.

The puncturing unit 121 punctures the bit values located in the column corresponding to the at least one second point from the generator matrix G to puncture the bit values located in the column of the i predetermined points.

For example, it is assumed that the generator matrix G is a generator matrix having a size of 8×16 and a code located on a third row among the RM codes existing in eight rows constituting the generator matrix G is a code having the minimum Hamming weight, the first extraction unit 116 can extract the RM code located in the third row as the first code.

Then, the first point confirmation unit 117 confirms at least one first point where the bit value of "1" is located in the bit string constituting the first code.

In this regard, when the first code is "1111111100000000", the first point confirmation unit 117 may confirm points of "first to eighth columns" as the at least one first point from the first code.

The intermediate matrix generation unit 118 extracts the bit values located in a column corresponding to the "first to eighth columns" which are the at least one first point from the generator matrix G having the size of 8×16 to generate the first matrix constituted by the bit values located in the column corresponding to the "first to eight columns". In this case, since the first matrix is a matrix obtained by extracting components of the column corresponding to the "first to eighth columns" from the generator matrix G having the size of 8×16, the first matrix has the size of 8×8.

When the first matrix is generated as described above, the second extraction unit 119 may extract the second code having the minimum Hamming weight among the codes existing in each row constituting the first matrix.

In this regard, when it is assumed that the code located in the fifth row among the codes existing in the eight rows constituting the first matrix is the code having the minimum Hamming weight, the second extraction unit 119 may extract the code located in the fifth row as the second code.

Then, the second point confirmation unit 120 may confirm at least one second point where the bit value of "1" is located in the bit string constituting the second code.

In this regard, when the second code is "11000000", the second point confirmation unit 120 may confirm points of "first and second columns" as the at least one second point from the second code.

Thereafter, the puncturing unit 121 punctures the bit values located in a column corresponding to the "first and second columns" which are the at least one second point from the generator matrix G having the size of 8×16 to generate the generator matrix $G_D$ in which the bit values located in two columns of the "first and second columns" are punctured in the generator matrix G having the size of 8×16.

In this case, since in the punctured generator matrix $G_D$, the bit values located in the "first and second columns" are punctured in the generator matrix G having the size of 8×16, the size of the punctured generator matrix $G_D$ becomes 8×14.

When the punctured generator matrix $G_D$ is generated as described above, the matrix generation unit 113 generates a scrambling matrix S having a size of k×k and a permutation matrix P having a size of (n−i)×(n−i).

Here, the matrix generation unit 113 may randomly generate the scrambling matrix S having the size of k×k, which has code values of "1" and "0" as the components and the permutation matrix P having the size of (n−i)×(n−i).

The public key generation unit 114 may generate a public key $K_{pub}$ by multiplying the scrambling matrix S, the punctured generator matrix $G_D$, and the permutation matrix P as shown in Equation 5 below.

$$K_{pub}=SG_DP \quad \text{[Equation 5]}$$

Thereafter, the message encryption and transmission unit 115 may encrypt a message m to be transmitted to the data reception apparatus 130 based on the public key $K_{pub}$ to generate an encrypted message c and then, transmit the encrypted message c to the data reception apparatus 130.

In this case, according to the exemplary embodiment of the present invention, the message encryption and transmission unit 115 generates a random vector e having a Hamming weight of $$t-\frac{i}{2}$$

or less and having a length of n−i bits and performs an exclusive OR operation of a result value c' obtained by multiplying the message m by the public key $K_{pub}$ and the random vector e to generate the encryption message c.

In this regard, the message encryption and transmission unit 115 may generate the encryption message c by performing an operation shown in Equation 6 below.

$$c=mK_{pub}\oplus e \quad \text{[Equation 6]}$$

Here, e represents a random vector having a Hamming weight of $$t-\frac{i}{2}$$

or less and having a length of n−i bits and "$\oplus$" represents the exclusive OR operation.

When the encryption message c is generated and the encryption message c is transmitted to the data reception apparatus 130 by the message encryption and transmission unit 115, the data reception apparatus 130 may decrypt the original message m from the encryption message c and according to the exemplary embodiment of the present invention, the data reception apparatus 130 may store the generator matrix G, the scrambling matrix S, the permutation matrix P, and information on the i predetermined points by the private key corresponding to the public key on a memory in advance in order to decrypt the encryption message c.

In this case, when the encryption message c is received, the data reception apparatus 130 decrypts the encryption message c based on the generator matrix G, the scrambling matrix S, the permutation matrix P, and the information on the i predetermined points stored in the memory to decrypt the message m.

In this case, according to the exemplary embodiment of the present invention, when the encryption message c is received, the data reception apparatus 130 calculates $cP^{-1}$ by multiplying the encryption message c by $P^{-1}$ which is an inverse matrix of the permutation matrix P, performs error correction on the $cP^{-1}$ based on the information on the i predetermined points and the generator matrix G to calculate mS obtained by multiplying the message m and the scrambling matrix S by each other and thereafter, multiplies the mS by $S^{-1}$ which is the inverse matrix of the scrambling matrix S to decrypt the message m.

In this regard, when the encryption message c is received, the data reception apparatus 130 may calculate $cP^{-1}$ by multiplying the encryption message c by $P^{-1}$ which is the inverse matrix of the permutation matrix P according to Equation 7 below.

$$cP^{-1}=mSG_D\oplus eP^{-1} \quad \text{[Equation 7]}$$

Then, the data reception apparatus 130 performs data decoding for error correction with respect to the $cP^{-1}$ by using the information on the i predetermined points which are points for the column in which the bit value is punctured in the punctured generator matrix $G_D$ and the generator matrix G to calculate the mS.

Here, since the e represents the vector having the Hamming weight of $$t-\frac{i}{2}$$

or less and P represents the permutation matrix, $eP^{-1}$ also has the Hamming weight of $$t-\frac{i}{2}$$

or less, and as a result, $cP^{-1}$ refers to the data in which i errors (the i errors are errors generated as the columns of the i predetermined points in the generator matrix G are all punctured) and $$t-\frac{i}{2}$$

or less additional errors (the additional errors are due to $eP^{-1}$) occur in codeword called mSG.

In this case, since error occurrence locations of i errors which may be regarded to occur as all columns of the i predetermined points are punctured in the generator matrix G are known, a data reception side is capable of restoring the errors by using only a half of the error correction capability. Therefore, the data reception apparatus 130 may correct the i errors and the additional errors of $$t-\frac{i}{2}$$

or less by performing decoding based on the RM code having the error correction capability for t-bit codes.

Therefore, the data reception apparatus 130 performs error correction on $cP^{-1}$ by using G which is the generator matrix of the RM code having the error correction capability for t-bit codes stored in the memory to finally calculate mS.

When the calculation of the mS is completed as such, the data reception apparatus 130 multiplies mS by $S^{-1}$ which is the inverse matrix of the scrambling matrix S stored in the memory as shown in Equation 8 below to finally decode the original message m.

$$mSS^{-1}=m \quad \text{[Equation 8]}$$

According to the exemplary embodiment described up to now, the data encryption apparatus 110 using the encryption key based on puncturing of the generator matrix according to the present invention may have an advantage in that the structure of the generator matrix is changed by such a manner of puncturing the bit values located in a column at a specific point from the generator matrix of the RM code and thereafter, performing encryption of the message through the public key generated by using the punctured generator matrix to defend the attack from a third party based on the structure of the RM code unlike a fact that the existing McEliece encryption system has a disadvantage in that a key exposure possibility is high as the generator matrix of the RM code having a special structure is used as it is.

FIG. 2 is a flowchart illustrating a data encryption method using an encryption key based on puncturing of a generator matrix according to another exemplary embodiment of the present invention.

In step S210, a generator matrix G (each row of the generator matrix G is constituted by RM codes) having a size of k×n (k and n are natural numbers) is generated based on the RM codes having an error correction capability for t (t is the natural number)-bit codes.

In step S220, a punctured generator matrix $G_D$ (the size of the punctured generator matrix $G_D$ is k×(n–i)) is generated by puncturing bit values located in a column of i (i is the natural number) predetermined points from the generator matrix G.

In this case, according to the exemplary embodiment of the present invention, step S220 may include: extracting a first code having a minimum Hamming weight among RM codes existing in each row constituting the generator matrix G, confirming at least one first point in which a bit value of "1" is located in a bit string constituting the first code, extracting bit values located in a column corresponding to the at least one first point from the generator matrix G, generating a first matrix including bit values located in a column corresponding to the at least one first point, extracting a second code having the minimum Hamming weight among the codes existing in each row constituting the first matrix, confirming at least one second point in which the bit value of "1" is located in the bit string constituting the second code, and puncturing the bit values located in the column of the i predetermined points by puncturing the bit values located in the column corresponding to the at least one second point from the generator matrix G.

In step (S230), a scrambling matrix S having a size of k×k and a permutation matrix P having a size of (n–i)×(n–i) are generated.

In step S240, a public key $K_{pub}$ ($K_{pub}=SG_DP$) is generated by multiplying the scrambling matrix S, the punctured generator matrix $G_D$, and the permutation matrix P.

In step S250, a message m to be transmitted to a data reception apparatus is encrypted based on the public key $K_{pub}$ and to generate an encryption message c and then, the encryption message c is transmitted to the data reception apparatus.

In this case, according to the exemplary embodiment of the present invention, in step S250, a random vector e having a Hamming weight of $$t - \frac{i}{2}$$

or less and having a length of n–i bits is generated and an exclusive OR operation of a result value c' obtained by multiplying the message m by the public key $K_{pub}$ and the random vector e is performed to generate the encryption message c.

According to the exemplary embodiment of the present invention, the data reception apparatus stores the generator matrix G, the scrambling matrix S, the permutation matrix P, and the information on the i predetermined points with a secret key corresponding to the public key in a memory and decodes the encryption message c based on the generator matrix G, the scrambling matrix S, the permutation matrix P, and the information on the i predetermined points to decode the message m when the encryption message c is received.

In this case, according to the exemplary embodiment of the present invention, when the encryption message c is received, the data reception apparatus calculates $cP^{-1}$ by multiplying the encryption message c by $P^{-1}$ which is an inverse matrix of the permutation matrix P, performs error correction on the $cP^{-1}$ based on the information on the i predetermined points and the generator matrix G to calculate mS obtained by multiplying the message m and the scrambling matrix S by each other and thereafter, multiplies the mS by $S^{-1}$ which is the inverse matrix of the scrambling matrix S to decrypt the message m.

Hereinabove, referring to FIG. 2, the data encryption method using an encryption key based on puncturing of a generator matrix according to the exemplary embodiment of the present invention has been described. Here, since the data encryption method using an encryption key based on the puncturing of the generator matrix according to the exemplary embodiment of the present invention may correspond to the configuration of an operation of the data encryption apparatus 110 using an encryption key based on puncturing of the generator matrix described by using FIG. 1, a more detailed description thereof will be omitted.

The data encryption method using an encryption key based on the puncturing of the generator matrix according to the exemplary embodiment of the present invention may be implemented by a computer program stored in a storage medium for executing the computer program through coupling with a computer.

Data encryption method using an encryption key based on the puncturing of the generator matrix according to the exemplary embodiment of the present invention may be implemented in a program command type which may be performed through various computer means and recorded in a computer readable medium. The computer readable medium may include singly a program command, a data file, or a data structure or a combination thereof. The program command recorded in the medium may be specially designed and configured for the present invention, or may be publicly known to and used by those skilled in the computer software field. Examples of the computer-readable recording medium include magnetic media such as a hard disk, a floppy disk, and a magnetic tape, optical media such as a CD-ROM and a DVD, magneto-optical media such as a floptical disk, and a hardware device which is specifically configured to store and execute the program command such as a ROM, a RAM, and a flash memory. Examples of the program command include a high-level language code executable by a computer by using an interpreter, and the like, as well as a machine language code created by a compiler. The hardware device may be configured to be operated with one or more software modules in order to perform the operation of the present invention and vice versa.

As described above, the present invention has been described by specified matters such as detailed components, and the like and limited exemplary embodiments and drawings, but the description is just provided to assist more overall understanding of the present invention and the present invention is not limited to the exemplary embodiment and various modifications and changes can be made by those skilled in the art from such a disclosure.

Accordingly, the spirit of the present invention should not be defined only by the described exemplary embodiments, and it should be appreciated that claims to be described below and all which are equivalent to the claims or equivalently modified to the claims are included in the scope of the spirit of the present invention.

What is claimed is:

1. A data encryption apparatus using an encryption key based on puncturing of a generator matrix, comprising:
   a generator matrix generation unit generating a generator matrix G—each row of the generator matrix G being constituted by RM codes—having a size of k×n (k and n are natural numbers) based on the RM codes having an error correction capability fort (t is the natural number)-bit codes;
   a generator matrix puncturing unit generating a punctured generator matrix $G_D$—the size of the punctured generator matrix $G_D$ being k×(n−i)—by puncturing bit values located in a column of i (i is the natural number) predetermined points from the generator matrix G;
   a matrix generation unit generating a scrambling matrix S having a size of k×k and a permutation matrix P having a size of (n−i)×(n−i);
   a public key generation unit generating a public key $K_{pub}$ ($K_{pub}=SG_DP$) by multiplying the scrambling matrix S, the punctured generator matrix $G_D$, and the permutation matrix P; and
   a message encryption and transmission unit encrypting a message m to be transmitted to a data reception apparatus based on the public key $K_{pub}$ to generate an encryption message c and transmitting the encryption message c to the data reception apparatus.

2. The data encryption apparatus of claim 1, wherein the generator matrix puncturing unit includes
   a first extraction unit extracting a first code having a minimum Hamming weight among RM codes existing in each row constituting the generator matrix G,
   a first point confirmation unit confirming at least one first point where a bit value of "1" is located in a bit string constituting the first code,
   an intermediate matrix generation unit extracting the bit values located in the column corresponding to the at least one first point from the generator matrix G and generating a first matrix having bit values located in the column corresponding to the at least one first point,
   a second extraction unit extracting a second code having the minimum Hamming weight among codes existing in each row constituting the first matrix,
   a second point confirmation unit confirming at least one second point where the bit value of "1" is located in a bit string constituting the second code, and
   a puncturing unit puncturing the bit values located in the column corresponding to the at least one second point from the generator matrix G to puncture the bit values located in the column of the i predetermined points.

3. The data encryption apparatus of claim 1, wherein the message encryption and transmission unit generates a random vector e having a Hamming weight of $$t - \frac{i}{2}$$

or less and having a length of n−i bits and performs an exclusive OR operation of a result value c' obtained by multiplying the message m by the public key $K_{pub}$ and the random vector e to generate the encryption message c.

4. The data encryption apparatus of claim 3, wherein the data reception apparatus stores the generator matrix G, the scrambling matrix S, the permutation matrix P, and the information on the i predetermined points with a secret key corresponding to the public key in a memory and decodes the encryption message c based on the generator matrix G, the scrambling matrix S, the permutation matrix P, and the information on the i predetermined points stored in the memory to decode the message m when the encryption message c is received.

5. The data encryption apparatus of claim 4, wherein when the encryption message c is received, the data reception apparatus calculates $cP^{-1}$ by multiplying the encryption message c by $P^{-1}$ which is an inverse matrix of the permutation matrix P, performs error correction on the $cP^{-1}$ based on the information on the i predetermined points and the generator matrix G to calculate mS obtained by multiplying the message m and the scrambling matrix S by each other and thereafter, multiplies the mS by $S^{-1}$ which is the inverse matrix of the scrambling matrix S to decrypt the message m.

6. A data encryption method using an encryption key based on puncturing of a generator matrix, comprising:
   generating a generator matrix G—each row of the generator matrix G being constituted by RM codes—having a size of k×n (k and n are natural numbers) based on the RM codes having an error correction capability for t (t is the natural number)-bit codes;
   generating a punctured generator matrix $G_D$—the size of the punctured generator matrix $G_D$ being k×(n−i)—by puncturing bit values located in a column of i (i is the natural number) predetermined points from the generator matrix G;
   generating a scrambling matrix S having a size of k×k and a permutation matrix P having a size of (n−i)×(n−i);
   generating a public key $K_{pub}$ ($K_{pub}=SG_DP$) by multiplying the scrambling matrix S, the punctured generator matrix $G_D$, and the permutation matrix P; and
   encrypting a message m to be transmitted to a data reception apparatus based on the public key $K_{pub}$ to generate an encryption message c and transmitting the encryption message c to the data reception apparatus.

7. The data encryption method of claim 6, wherein the generating of the punctured generator matrix $G_D$ includes
   extracting a first code having a minimum Hamming weight among RM codes existing in each row constituting the generator matrix G, confirming at least one first point where a bit value of "1" is located in a bit string constituting the first code, extracting the bit values located in the column corresponding to the at least one first point from the generator matrix G and generating a first matrix having bit values located in the column corresponding to the at least one first point, extracting a second code having the minimum Hamming weight among codes existing in each row constituting the first matrix, confirming at least one second point where the bit value of "1" is located in a bit string constituting the second code, and puncturing the bit values located in the column corresponding to the at least one second point from the generator matrix G to puncture the bit values located in the column of the i predetermined points.

8. The data encryption method of claim 6, wherein in the transmitting of the encryption message c to the data reception apparatus, a random vector e having a Hamming weight of $$t - \frac{i}{2}$$

or less and having a length of n−i bits is generated and an exclusive OR operation of a result value c' obtained by multiplying the message m by the public key $K_{pub}$ and the random vector e is performed to generate the encryption message c.

9. The data encryption method of claim 8, wherein the data reception apparatus stores the generator matrix G, the scrambling matrix S, the permutation matrix P, and the information on the i predetermined points with a secret key corresponding to the public key in a memory and decodes the encryption message c based on the generator matrix G, the scrambling matrix S, the permutation matrix P, and the information on the i predetermined points stored in the memory to decode the message m when the encryption message c is received.

10. The data encryption method of claim 9, wherein when the encryption message c is received, the data reception apparatus calculates $cP^{-1}$ by multiplying the encryption message c by $P^{-1}$ which is an inverse matrix of the permutation matrix P, performs error correction on the $cP^{-1}$ based on the information on the i predetermined points and the generator matrix G to calculate mS obtained by multiplying the message m and the scrambling matrix S by each other and thereafter, multiplies the mS by $S^{-1}$ which is the inverse matrix of the scrambling matrix S to decrypt the message m.

11. A non-transitory computer readable recording medium having a program recorded therein for allowing a computer to execute a data encryption method using an encryption key based on puncturing of a generator matrix, comprising:

generating a generator matrix G—each row of the generator matrix G being constituted by RM codes—having a size of k×n (k and n are natural numbers) based on the RM codes having an error correction capability for t (t is the natural number)-bit codes;

generating a punctured generator matrix $G_D$—the size of the punctured generator matrix $G_D$ being k×(n−i)—by puncturing bit values located in a column of a (i is the natural number) predetermined points from the generator matrix G;

generating a scrambling matrix S having a size of k×k and a permutation matrix P having a size of (n−i)×(n−i);

generating a public key $K_{pub}$ ($K_{pub}=SG_DP$) by multiplying the scrambling matrix S, the punctured generator matrix $G_D$, and the permutation matrix P; and encrypting a message m to be transmitted to a data reception apparatus based on the public key $K_{pub}$ to generate an encryption message c and transmitting the encryption message c to the data reception apparatus.

* * * * *